United States Patent
Vamos et al.

(10) Patent No.: US 10,911,239 B2
(45) Date of Patent: Feb. 2, 2021

(54) PROTECTION OF LOGIN PROCESSES

(71) Applicant: Siemens Aktiengesellschaft, Munich (DE)

(72) Inventors: Benedikt Vamos, Neubiberg (DE); Michael Kirchner, Munich (DE)

(73) Assignee: SIEMENS AKTIENGESELLSCHAFT

( * ) Notice: Subject to any disclaimer, the term of this patent is extended or adjusted under 35 U.S.C. 154(b) by 0 days.

(21) Appl. No.: 16/765,552

(22) PCT Filed: Oct. 10, 2018

(86) PCT No.: PCT/EP2018/077585
§ 371 (c)(1),
(2) Date: May 20, 2020

(87) PCT Pub. No.: WO2019/101420
PCT Pub. Date: May 31, 2019

(65) Prior Publication Data
US 2020/0313892 A1    Oct. 1, 2020

(30) Foreign Application Priority Data
Nov. 22, 2017 (EP) ................... 17203075

(51) Int. Cl.
*H04L 29/06* (2006.01)
*H04L 9/32* (2006.01)
(Continued)

(52) U.S. Cl.
CPC ............ *H04L 9/3228* (2013.01); *G06F 21/31* (2013.01); *G06F 21/45* (2013.01); *G06Q 20/123* (2013.01);
(Continued)

(58) Field of Classification Search
CPC ........ G06F 21/31; G06F 21/45; H04L 63/083; H04L 9/3228
See application file for complete search history.

(56) References Cited

U.S. PATENT DOCUMENTS

2014/0380418 A1* 12/2014 Wang ................ H04L 63/08
726/3
2016/0344752 A1* 11/2016 Sterne .............. H04L 63/083
(Continued)

FOREIGN PATENT DOCUMENTS

EP    0941524 A1    9/1999

OTHER PUBLICATIONS

Golla Maximilian Et Al: ""I want my money back!" Limiting Online Password-Guessing Financially", Symposium on Usable Privacy and Security (SOUPS), pp. 1-6, XP055444957, Santa Clara, California, Retrieved from the Internet: URL:https://www.usenix.org/system/files/way2017-golla.pdf, [retrieved on Jan. 26, 2018], Section 1, Section 3.1, Section 3.2.2, Section 4.1, Section 4.3, figure 1, Jul. 2017.
(Continued)

*Primary Examiner* — Thaddeus J Plecha
(74) *Attorney, Agent, or Firm* — Schmeiser, Olsen & Watts LLP

(57) ABSTRACT

A method for protecting a login process of a user to a service provider against brute force attacks is provided. A financial value is transferred from the user to a token provider for a temporary login token. A login attempt is performed by the user on the service provider, wherein the login attempt requires user specific login data and the temporary login token. If the login on the service provider was successful within a predefined number of login attempts, the financial value is transferred back to the user.

14 Claims, 2 Drawing Sheets

(51) Int. Cl.
  *H04L 9/06* (2006.01)
  *G06Q 20/22* (2012.01)
  *G06Q 20/36* (2012.01)
  *G06Q 20/12* (2012.01)
  *G06F 21/45* (2013.01)
  *G06F 21/31* (2013.01)

(52) U.S. Cl.
  CPC ......... *G06Q 20/29* (2013.01); *G06Q 20/3678* (2013.01); *H04L 9/0637* (2013.01); *H04L 9/3213* (2013.01); *H04L 63/083* (2013.01)

(56) References Cited

U.S. PATENT DOCUMENTS

2017/0180343 A1* 6/2017 de Ganon ........... G06F 21/6263
2017/0187700 A1* 6/2017 Rangaraj ................. H04L 63/08

OTHER PUBLICATIONS

PCT International Search Report and Written Opinion of International Searching Authority dated Jan. 18, 2019 corresponding to PCT International Application No. PCT/EP2018/077585 filed Oct. 10, 2018.

* cited by examiner

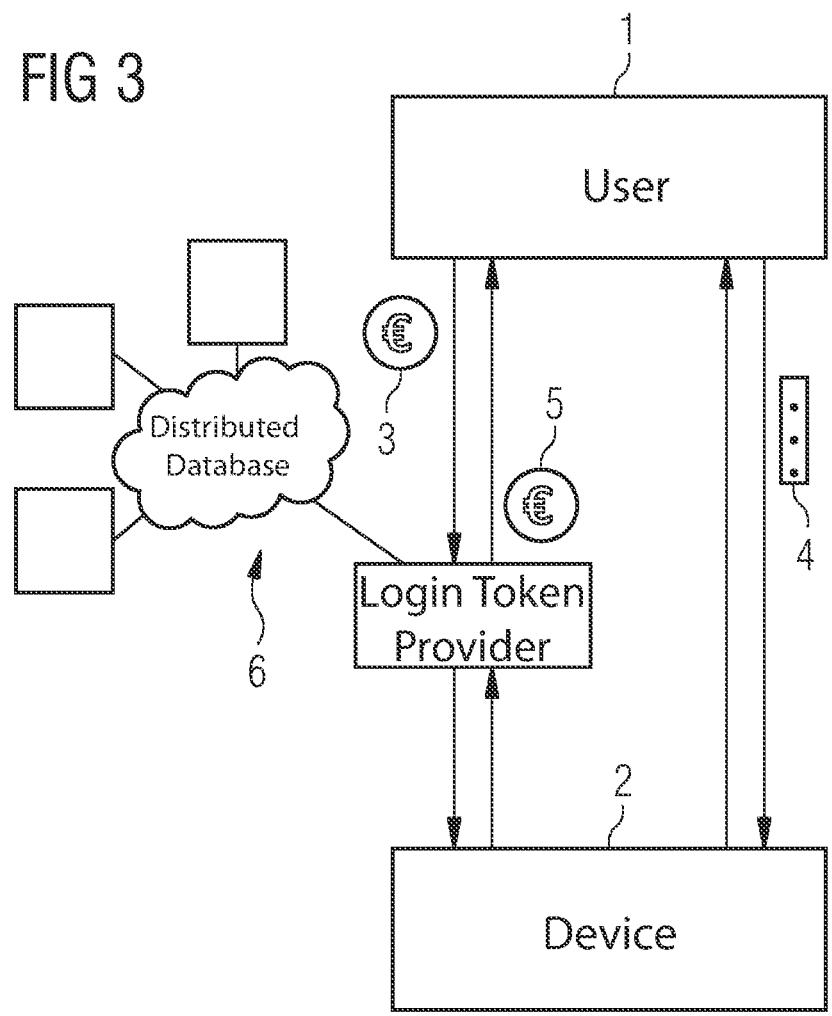
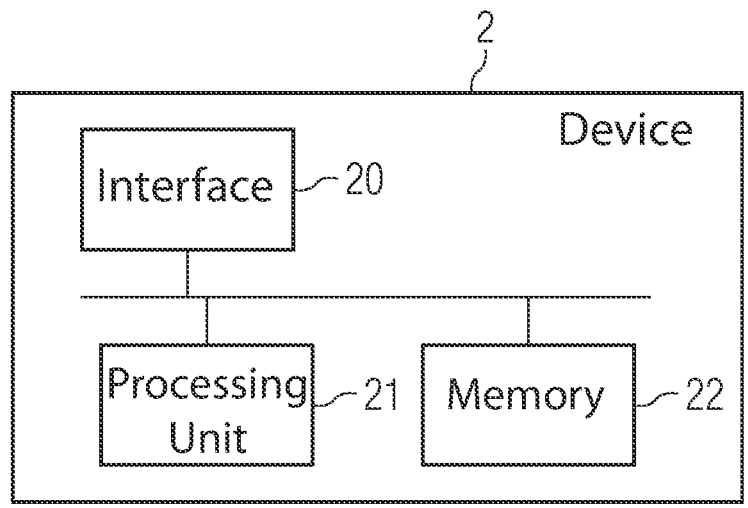

PROTECTION OF LOGIN PROCESSES

CROSS-REFERENCE TO RELATED APPLICATIONS

This application claims priority to PCT Application No. PCT/EP2018/077585, having a filing date of Oct. 10, 2018, which is based off of EP Application No. 17203075.1, having a filing date of Nov. 22, 2017, the entire contents both of which are hereby incorporated by reference.

FIELD OF TECHNOLOGY

The following relates to login processes of a user to a service provider, and in particular to a method for protecting login processes of a user to a service provider against brute force attacks. Furthermore, a corresponding computing device, computing network and computer program product are provided.

BACKGROUND

Common login processes to service providers, which are based on user names and user passwords, are often object to brute force attacks. In particular, brute force is an attack method that uses scripts to test numerous user names and user password combinations automatically with the intention of guessing the correct access data. If a simple password has been chosen, which for example is only a few characters long or a word contained in a dictionary, the probability that the access data can be easily guessed increases.

Such brute force attacks against login processes, e.g. against login processes of a web application, can be carried out in a variety of different variants. For example, by selecting a specific user (e.g. "Administrator") and trying out numerous possible passwords for that user. An alternative variant is selecting a specific probable password (e.g. "Password123") and trying out numerous user accounts. In particular, the larger the user group of an application, the more likely it is to find an individual user, who has actually chosen this specific password.

Conventional protection measures against brute force attacks on login processes exist, wherein according to one protection measure users are forced to use passwords with high password complexity. This typically requires that passwords must have a certain minimum length or contain special characters and digits. In practice, however, this makes it harder for the end users to remember their passwords, and therefore, an end user will often bypass the protection measure by choosing simple passwords, such as "Password123456!". These simple passwords are technically compliant with the guidelines for choosing a password and are therefore accepted by the system, however they still can be very easily guessed.

Another conventional protection measure is locking user accounts in case of too many failed login attempts. Therein, user accounts are locked after too many failed login attempts and are only reactivated by an administrator or after a predetermined time. However, an attacker can use this mechanism to cause a denial of service by intentionally sending false login attempts, thereby locking specific users out and preventing them from using the application.

Furthermore, rate limiting can be used, wherein this protection measure records for example per IP address how many failed login attempts have been caused in a given time. If the number is too high, the IP address will be blocked for further login attempts. Problems occur with this protection measure, if numerous legitimate users are located behind the same IP address, for example due to Network Address Translation (NAT), or because of a proxy server.

According to further prevention measure so-called One-Time-Tokens can be required to sign a user in to a service provider, as for example in PIN/TAN login processes, Two-Step-Authentication with text messages on mobile phones, or time-based OTP processes such as Google Authenticator. However, these protection measures require preceding registration steps, in other words binding steps, by the user of the respective security token with the service-provider, which is time consuming and requires additional effort for the user. Furthermore, these One-Time-Tokens are not available instantaneously and anonymously to an arbitrary new user in a login process.

The document "'I want my money back!' Limiting Online Password-Guessing Financially" by Maximilian Golla et al. in Symposium on Usable Privacy and Security, 14 Jul. 2017, pages 1-6, XP055444957, Santa Clara, Calif., which can be retrieved under https://www.usenix.org/system/files/way2017-golla.pdf discloses a method for an opt-in deposit based approach to rate-limiting that tackles online guessing attacks. Therein, a small deposit is demanded for each login attempt, which is immediately refunded after a successful sign in, such that online guessing attackers face high costs for repeated unsuccessful logins.

The document EP 0 941 524 A1 discloses a digital payment system, wherein a sequence of random numbers is stored at a payment server, wherein a set of digitally encoded random numbers derived from the stored sequence and are issued to a user in return for payment. Therein, the tokens are stored in a carnet and the user can then spend the tokens by transferring tokens to a merchant. The merchant returns each token received to the payment server, wherein the payment server authenticates the token and transmits an authentication message to the merchant.

If the above-mentioned protection measures and their respective disadvantages cannot be accepted in a specific use case, then it can also be accepted that brute force attacks can be carried out on a login process.

SUMMARY

Accordingly, there is a need for improved protection measures for login processes of service providers against brute force attacks, which overcome the above-mentioned disadvantages. Therefore, an aspect relates to provide such an improved method, a respective device, computer program product (non-transitory computer readable storage medium having instructions, which when executed by a processor, perform actions) and computing network, which provide improved protection against brute-force attacks on a login process of a service provider.

According to a first aspect of embodiments of the invention, a method for logging in a user on a service provider is provided. In a first step, a first financial value is transferred from the user to a token provider for a temporary login token, and in response, the temporary login token is received from by the user from the token provider. In a further step, a login attempt is performed on the service provider by the user using user specific login data and the temporary login token, wherein the login attempt requires user specific login data and the temporary login token. In another step, a second financial value is transferred to the user if the login on the service provider was successful within a predefined number of login attempts, wherein the second financial value has substantially the same value as the first financial value.

Thereby an improved method for protecting a login process against brute force attacks is provided, which extends a login process by additional transaction steps and thereby increases the technical complexity as well as the cost for an attacker by including the additional transaction steps including a financial factor. Therein, the additional transaction steps can run in the background and transparently for the end user and make brute-force attacks expensive in effort and finance and, therefore, unattractive for the attacker.

According to the method of embodiments of the invention, the login process is advantageously secured by directly executed transactions, which can be micro-financial value transactions, such as those made possible by distributed database systems or blockchain-based systems, such as IOTA, PIVX, or corresponding public payment protocols with consent and validation mechanisms. In particular, a user who wants to register with a service provider guarantees by depositing a financial value that he or she can successfully complete a registration, e.g. within 10 attempts, whereas for an attacker who wants to carry out several thousand login operations in the context of a brute force attack, for example, the procedure is too expensive. Therefore, alternative security mechanisms such as locking user accounts or setting up rate limits against IP addresses are no longer necessary. Furthermore, the service provider could even benefit financially from brute force attacks that have actually been carried out. Additionally, it is not necessary to establish an assignment between the user and his or her blockchain wallet, i.e. a verification that a user owns a specific wallet. Advantageously, the user can use an arbitrary electronic payment wallet for the login process, change it over time for another log in process, possibly use wallets of different blockchain technologies, which provide anonymous financial value services.

According to a second aspect of embodiments of the invention, a device configured for providing a service to a user is provided, which in particular can be a service provider, or a computing device configured for providing a service to a user, the device comprising a memory, and at least one processing unit, the memory containing instructions executable by said at least one processing unit, wherein execution of the instructions causes the device to execute the steps of a method as described above for the first aspect of embodiments of the invention.

The device for logging in a user on a service provider described in the second aspect can be configured to perform any one or any combination of the methods described above in the first aspect. For such devices, technical effects can be achieved, which correspond to the technical effects described for the method for logging in a user on a service provider according to the first aspect.

According to a third aspect of embodiments of the invention, a computing network is provided, wherein the computing network comprises at least one computing device as described above for the second aspect of embodiments of the invention.

According to a fourth aspect of embodiments of the invention, a computer program product comprises program code. The program code is executable by at least one processor. Executing the program code causes the at least one processor to perform one of the methods for logging in a user on a service provider according to the first aspect of embodiments of the invention.

For such a device, computing network, and computer program product for logging in a user on a service provider, technical effects can be achieved, which correspond to the technical effects described for the first aspect of embodiments of the invention.

Although specific features described in the above summary and the following detailed description are described in connection with specific embodiments and aspects of embodiments of the present invention, it should be understood that the features of the exemplary embodiments and aspects may be combined with each other, and correlate to each other, unless specifically noted otherwise.

Therefore, the above summary is merely intended to give a short overview over some features of some embodiments and implementations and is not to be construed as limiting. Other embodiments may comprise other features than the ones explained above.

BRIEF DESCRIPTION

Some of the embodiments will be described in detail, with reference to the following figures, wherein like designations denote like members, wherein:

FIG. 3 illustrates a schematic drawing of a further device for providing a service to a user using a distributed database, according to embodiments of the invention; and FIG. 4 illustrates a schematic drawing of a further device for providing a service to a user, according to embodiments of the invention.

DETAILED DESCRIPTION

Figure 1:
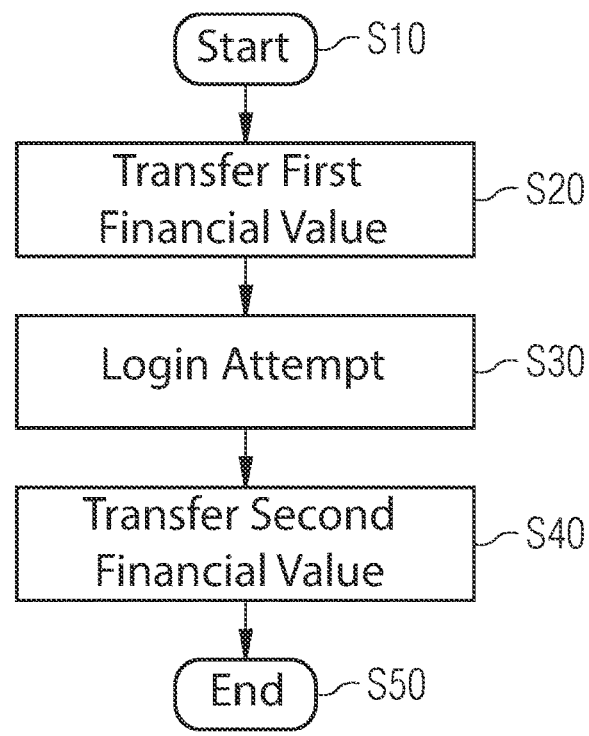
FIG. 1 illustrates a flowchart with steps for logging in a user on a service provider, according to embodiments of the invention.

In the following, embodiments of the invention will be described in detail with reference to the accompanying drawings. It is to be understood that the following description of embodiments is not to be taken in a limiting sense. The scope of embodiments of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, modules or other physical or functional units shown in the drawings or described herein may also be implemented by a direct or indirect, connection or coupling. A coupling between components may be established wired or over a wireless connection. Functional blocks, computing devices, nodes or entities may be implemented in hardware, firmware, software, or a combination thereof.

Hereinafter, various techniques with respect to employing a method and computing device for logging in a user on a service provider are described.

A user 1 within the meaning of the present disclosure may refer to a natural person or technical user who wants to log on to the service provider 2, wherein a service provider 2 or a device 2 for providing a service to a user 1 is an entity that accepts a login or logon, e.g. by means of a user name and password, and then provides the user 1 with a certain service.

A service within the meaning of the present disclosure may refer to any technical concepts implemented in a computing infrastructure. Hereby, it may be enabled to computing capabilities storing and processing data in either a privately owned cloud, or on a third-party server located in a data center in order to make data accessing mechanisms more efficient and reliable.

A network within the meaning of the present disclosure may refer to any set of nodes which enables a plurality of participants to perform data communication with each other. The network may be a public network or a private network. The network may or may not be based on a blockchain platform. The network may be connected to at least one further network. The network may irreversibly process the data based on blockchain techniques.

A distributed network within the meaning of the present disclosure may refer to any database implemented in a network, which is at least partly stored redundantly on several network nodes remote from each other. Blockchain technology may comprise a plurality of blocks comprising data related to transactions and/or Smart Contracts. Chaining of different blocks may be implemented by cryptographic hash values stored in each block, wherein each hash value may refer to data of a previous block.

FIG. 1 illustrates a flowchart with steps for logging in a user on a service provider, according to embodiments of the invention.

The method starts with step S10. In step S20, a first financial value 3 is transferred from the user to a token provider 7 for a temporary login token 4. In step S30, a login attempt is performed on the service provider 2, wherein the login attempt requires user specific login data and the temporary login token 4. In step S40, a second financial value 5 is transferred to the user 1 if the login on the service provider 2 was successful within a predefined number of login attempts, wherein the second financial value 5 has substantially the same value as the first financial value 3. The method ends with step S50.

Figure 2:
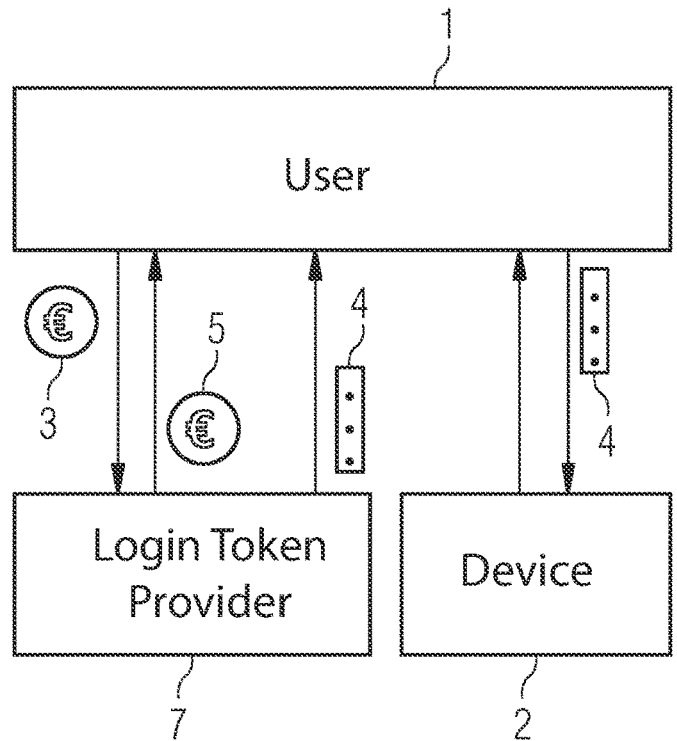
FIG. 2 illustrates a schematic drawing of a device for providing a service to a user, according to embodiments of the invention.

FIG. 2 illustrates a schematic drawing of a device 2 for providing a service to a user 1, according to embodiments of the invention.

As can be seen in FIG. 2, a user 1 performs transactions with a login token provider 7 and with the device 2 for providing a service to a user 1, in order to log in to the device 2.

In a login attempt, the user 1 provides specific login data comprising a user name and a corresponding user specific password to the service provider 2.

The service provider 2 requires the following three data blocks when logging in the user:

User name+user specific password+login token 4

In an ideal implementation, the additional "login token" factor mentioned here is handled transparently in the background for the user 1, so that the user continues to enter only the user name and password as usual. For example, a login token 4 can be represented by a long, random-looking string, or the temporary login token can be a software token, such as a character string, data set, data block, private/public key pair, an identifier, or any other secret information, which can not easily be guessed by a third person.

In another transaction between the user 1 and the token provider 7, a temporary login token 4 is purchased. The user 1 transfers a certain value 3, as example a financial value 3, to the service provider 2. In response, he receives a valid temporary login token 4 and the guarantee that the financial value 3 is immediately transferred back to the user 1 as soon as the login procedure was successful. A login token 4 is limited in its validity, e.g. for maximum 10 login attempts.

The transfer of the financial values must be based on a method that executes transactions immediately (no delay of several minutes or hours). Ideally, a procedure is used that does not generate transaction fees for the user. Therefore, it is advantageously based on a distributed database, such as on a database based on blockchain technology, such as one of the micropayment protocols IOTA, PIVX, ETHEREUM, DASH and BITCOIN CASH. Any other micropayment protocol can be used, as it is known to the person skilled in the art.

In a further transaction, if the service provider 2 processes a login attempt with a correct username and password, the login token is invalidated and the financial value 5 is returned to the sender's address from the token provider 7. In another embodiment, the financial value 5 can be returned to the user 1 from the service provider 2.

If the service provider 2 processes a login attempt with an incorrect user name and password, the number of attempts allowed with this temporary login token 4 is reduced by 1. If the number of attempts allowed reaches 0, the temporary login token is invalidated and the financial value 3 associated with the login token 4 is retained by the login token provider 7, or in another embodiment by the service provider 2. In one embodiment the service provider 2 and the login token provider 7 can be the same entity.

FIG. 3 illustrates a schematic drawing of a further device 2 for providing a service to a user 1 using a distributed database, according to embodiments of the invention.

As can be derived from FIG. 3, the user 1 performs transactions over a distributed database 6 with a service provider 2, and directly with the service provider 2. The transactions performed correspond to the transactions described for FIG. 2, wherein the transfers of financial values 3,5 is performed using a distributed database 6, and furthermore the service provider 2 is also the login token provider 7 for the user 1.

FIG. 4 illustrates a schematic drawing of a further device 2 for providing a service to a user 1, according to embodiments of the invention.

The device 2 shown in FIG. 4 can perform one of the methods for logging in a user 1 as described above, wherein the device 2 further comprises an interface 20 which is adapted for transmitting user data or control messages to other entities such servers of distributed database 6 and which is provided for receiving user data or control messages from other entities such as the servers of the distributed database 6 or any other nodes located in a computing network. The interface 20 is especially qualified to receive the login data, such as user name, user specific password and temporary login token from a user 1, as described for the first aspect of embodiments of the invention. The device 2 furthermore comprises a processing unit 21, which is responsible for the operation of the device 2. The processing unit 21 comprises one or more processors and can carry out instructions stored in a memory 22, wherein the memory 22 can include a read-only memory, a random access memory, a mass storage, a hard disk or the like. The memory can furthermore include a suitable program code to be executed by the processing unit 21 so as to implement the above described functionalities in which the device 2 is involved.

From the above said, some general conclusions can be drawn:

In response to transferring the first financial value, a temporary login token can be received by the user from the token provider. The service provider can further provide a guarantee for the temporary login token, that it can be used for a predetermined number of login attempts and that the financial value will be transferred back to the user if one of the login attempts within the predefined number of login attempts is successful. Thereby, it is ensured, that a user, who wants to log in on a service provider first has to deposit a financial value, before he receives a temporary login token, which is necessary for attempting a login on the service provider.

The temporary login token can be invalidated if the login on the service provider was successful. Invalidating the temporary login token after a successful login attempt, prevents further usage of the temporary login token and therefore contributes to preventing further login attempts with the temporary login token by an attacker.

The service provider can be the token provider, or the service provider can comprise the token provider. Unity of the service provider and the token provider enables fast and efficient communication and, therefore improved performance of the login process.

The login token can be only provided if the transfer of the first and the second financial values has been completed, and the user has no possibility to cancel or undo transfer of the financial value by his own action. Thereby, it is further ensured, that a user, who wants to log in on a service provider first has to deposit a financial value, before he receives a temporary login token, which is necessary for attempting a login on the service provider.

The financial value can be transferred back only if the login of the user on the service provider was successful, wherein in response to that the login on the service provider was successful, the financial value is transferred from the token provider, or from the service provider, to the user.

The temporary login token can be a software token, such as a character string, data set, data block, private/public key pair, an identifier, or any other secret information, which cannot easily be guessed by a third person. Thereby, the temporary log in token is secure and can easily be received by the user from the token provider.

The first and the second financial values can be transferred from and/or to anonymous wallets owned by the user in an electronic database. Thereby, the login process can be secured without previous binding and registering of the user, respectively a security feature owned by the user, with the token provider. Therefore, any user can perform the login process according to embodiments of the invention, wherein the only requirement for the user is, that he owns a wallet, with which he can transfer a financial value to the service provider.

The first and the second financial values can be transferred using a distributed database, wherein the data is stored redundantly on multiple computers located remotely from each other. Using a distributed database make the transferring of the financial values and the temporary login token more secure, faster and where required anonymous, i.e. no pre-registering of the user has to be done before the login process.

The first and the second financial values can be transferred using a database based on blockchain technology. Further, smart contracts can be used as basis for the transfer of the financial value combined with the transfer of the temporary login token. In particular, the first and the second financial values can be transferred using a micropayment protocol chosen from the group comprising IOTA, PIVX, ETHEREUM, DASH and BITCOIN CASH. The above-mentioned technologies enable a more reliable login process than proprietary solutions, which further is more secure, faster and where required anonymous, i.e. no pre-registering of the user has to be done before the login process.

The temporary login token can be valid for a predefined number of login attempts, whereby the user has several attempts to login to the service provider in the first attempt, such that some errors in the login process do not lead to loss of the temporary login token. Therefore, the risk for the authorized user to lose the financial value deposited is reduced.

The temporary login token is invalidated in response to that the temporary login token has been used for the predefined number of login attempts. Invalidating the temporary login in token in response to that the temporary login token has been used for the predefined number of login attempts prevents that the more than the predefined number of login attempts can be carried out before a new transfer of financial value for a new temporary login token is necessary.

No financial value can be transferred to the user if the temporary login token is invalidated after it has been used for the predefined number of login attempts, thereby providing an increased transaction effort and the loss of a financial value after the predefined number of unsuccessful login attempts to an unauthorized user, or attacker, such that a brute-force attack is made unattractive due to increased effort and cost.

Summarizing, a method for logging in a user on a service provider is provided, wherein a financial value is transferred from the user to a token provider for a temporary login token, wherein a login attempt is performed requiring user specific login data and the temporary login token. If the login on the service provider was successful within a predefined number of login attempts, then the financial value is transferred back to the user.

Thereby, the login process is advantageously secured by additional transactions, which increase effort, complexity and cost for an attacker, wherein the additional transaction steps can run in the background and transparently for an authorized end user and make brute-force attacks unattractive for an attacker. Additionally, it is not necessary to establish an assignment or registration between the user and his or her blockchain wallet and token provider, i.e. a verification that a user owns a specific wallet, so that the user can use an arbitrary wallet for the login process, change it over time, possibly use wallets of different blockchain technologies, or similar anonymous financial protocols.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for logging in a user on a service provider, the method comprising:
transferring a first financial value from the user to a token provider for a temporary login token;
performing a login attempt on the service provider, wherein the login attempt requires user specific login data and the temporary login token;
transferring a second financial value to the user and invalidating the temporary login token if the login on the service provider was successful within a predefined number of login attempts, wherein the second financial value has the same value as the first financial value or is within a variance amount.

2. The method according to claim 1, wherein in response to transferring the first financial value, a temporary login token is received by the user from the token provider.

3. The method according to claim 1, wherein the service provider, is the token provider.

4. The method according to claim 1, wherein the temporary login token is a software token.

5. The method according to claim 1, wherein the first and the second financial values are at least one of transferred from and to an anonymous wallet owned by the user in an electronic database.

6. The method according to claim 1, wherein determining whether the first and the second financial values are transferred using a distributed database, wherein data is stored redundantly on multiple computers located remotely from each other.

7. The method according to claim 1, wherein the first and the second financial values are transferred using a database based on blockchain technology.

8. The method according to claim 1, wherein the first and the second financial values are transferred using the micropayment protocol IOTA.

9. The method according to claim 1, wherein the temporary login token is valid for the predefined number of login attempts.

10. The method according to claim 1, wherein the temporary login token is invalidated in response to that the temporary login token has been used for the predefined number of login attempts.

11. The method according to claim 1, wherein no financial value is transferred to the user if the temporary login token is invalidated after the temporary login token has been used for the predefined number of login attempts.

12. A computer program product, comprising a computer readable hardware storage device having computer readable program code stored therein, said program code executable by a processor of a computer system to implement a method comprising a program code which is executed by the processor, wherein executing the program code causes the processor to execute a method for logging in a user on a service provider according to claim 1.

13. A device configured for providing a service to a user, the device comprising a memory, and at least one processing unit, the memory containing instructions executable by the at least one processing unit, wherein execution of the instructions causes the device to execute a method according to claim 1.

14. A computing network wherein the computing network comprises at least one device according to claim 13.

* * * * *